(12) United States Patent
Hosler et al.

(10) Patent No.: US 7,031,252 B1
(45) Date of Patent: *Apr. 18, 2006

(54) REFLECTOR COMMUNICATIONS CHANNEL FOR AUTOMATIC PROTECTION SWITCHING

(75) Inventors: Jay Hosler, Soquel, CA (US); Peter Lothberg, Karlsbad (SE)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/537,439

(22) Filed: Mar. 27, 2000

(51) Int. Cl.
*H04L 12/26* (2006.01)
*H04L 12/28* (2006.01)
*H04J 3/14* (2006.01)

(52) U.S. Cl. .................. 370/217; 370/221; 370/225
(58) Field of Classification Search ........ 370/229–240, 370/241–253, 216–228; 714/2–24
See application file for complete search history.

(56) References Cited

U.S. PATENT DOCUMENTS 5,570,344 A * 10/1996 Fujii ...................... 370/217
6,031,838 A *  2/2000 Okabe et al. ............ 370/395.6
6,614,753 B1 *  9/2003 Ikawa ...................... 370/222

* cited by examiner

Primary Examiner—Chi Pham
Assistant Examiner—Ronald Abelson
(74) Attorney, Agent, or Firm—Campbell Stephenson Ascolese LLP

(57) ABSTRACT

An apparatus and method for a communications network including at least one interface circuit reads frame data received from the communications network and writes frame data to be transmitted over the communications network, the frame data including a plurality of transport overhead fields. The apparatus includes signature logic coupled to the interface circuit, the signature logic identifying signature data and writing the signature data into transport overhead fields in an outgoing frame. Reflector logic coupled to the interface circuit copies data from one of the received transport overhead fields, the copied data being placed into a transport overhead field in the outgoing frame, the copied data including the received signature data. The interface circuit compares the copied data to earlier received frame data from the communications network, the determination of a mismatch identifying a transition requiring an update of at least one routing table. The data is used to determine configuration compatibility between interfaces and among a plurality of tributary interfaces and to eliminate dependence on multiplexers that transmit to routers with protect circuits according to protection switching protocols. A method for a communications network includes transmitting signature data in a transport overhead field, the data identifying one of interfaces in the local routers, returning the data to the local router, and configuring a communications relationship using the data. The method includes using the data to determine which is an active interface and to determine whether to update at least one routing table and using the data to configure the interface circuits.

42 Claims, 4 Drawing Sheets

REFLECTOR COMMUNICATIONS CHANNEL FOR AUTOMATIC PROTECTION SWITCHING

BACKGROUND OF THE INVENTION

1. Field of the Invention

The present invention relates to network communications, and more specifically, automatic protection switching in network communications.

2. Description of the Related Art

A collection of interconnected networks is an "internet." An internet is formed when separate networks are connected together. The specific worldwide computer internet, the "Internet" refers to a global computer network that consists of internetworked communications systems. Computer networks such as the Internet use a protocol hierarchy organized as a series of layers. The combination of layers and protocols for a given computer network is referred to as a network architecture. Each layer may have a protocol governing the method of communication for the layer. A protocol refers to rules that govern the format of frames and packets that are exchanged via a computer network to a peer entity. One such protocol, "IP" (Internet Protocol) defines the packet format for a network layer.

Another layer of a computer network is the physical layer. The physical layer relates to the transmitting over a communication channel and concerns the physical transmission medium. One physical medium used for computer networks today is optical fiber. The optical fiber standard used for most long-distance telephone connections is Synchronous Optical NETwork (SONET).

A similar standard to SONET is the Synchronous Digital Hierarchy (SDH) which is the optical fiber standard predominantly used in Europe. There are only minor differences between the two standards. Accordingly, hereinafter any reference to the term SONET refers to both SDH and SONET networks, unless otherwise noted.

SONET provides a standard for multiplexing multiple digital channels together. SONET is a time division multiplexing system that devotes the entire bandwidth of the fiber to one channel that contains time slots for various subchannels. Accordingly, it is a "synchronous" system. A SONET line transmits digital information in bits at precise intervals. SONET systems are made up of switches, multiplexers and repeaters. In SONET terms, the transmission between two endpoints can be conceptually broken into a hierarchy of sub-parts, comprising of a "section," the fiber connection directly connecting one device to another device; a "line," the fiber connection between any two network elements that terminate lines, i.e., line terminating equipment (LTEs) including multiplexers; and a "path" the fiber connection between a source and a destination that terminates in path terminating equipment (PTEs). A line consists of several sections, and a path consists of several lines. Topologically, a SONET system can be either a mesh or a dual ring. Note that the term "line" used in a SONET network is equivalent to the term "section" in a SDH network.

Data transmitted according to the SONET standard is in frames, which, according to one standard, are organized as blocks of data with a block of 810 bytes transmitted every 125 μsec. The number of bytes transmitted per frame varies with the transmission rate of the connection, but in all cases frames are transmitted at a rate of 8000 frames per second which matches the sampling rate of pulse code modulation channels that are used in digital telephony systems.

The SONET system specification includes provisions for automatic protection and reconfiguration in case of failure, called APS (Automatic Protection Switching) in the SONET specification, and MSP (Multiplex Section Protection) in the SDH specification. An APS/MSP configuration could include one 'protect' interface circuit and one 'working' interface circuit. One such APS configuration is known as "1+1 linear APS". In a 1+1 linear APS configuration, any data transmitted by a network element is transmitted to both the working circuit and the protect circuit connected to the network element.

When routers are configured as network elements in a SONET system configured for APS, the interface circuits connecting the routers to the working and protect circuits may be configured to be located in separate routers or the same router. Protection occurs at the SONET line level (in SDH terminology, protection occurs at the SDH section level). Protection control bytes transmitted between LTEs, the end points of a SONET line, communicate APS protection information. This protection information includes whether the protect or working circuit is currently active. Normally, when all equipment is functioning correctly, traffic is carried by the working circuit. In APS configurations involving routers, the working interface is active and the protect interface is inactive. If the working circuit fails, an "APS switch" occurs, causing deactivation of the working circuit and activation of the protect circuit. In APS configurations involving routers, the working interface is deactivated and the protect interface is activated.

The transmissions between LTE are synchronized by the protection information transmitted in the protection control bytes. Some SONET/SDH multiplexers do not comply with the SONET/SDH standards, and do not appropriately transmit protection control bytes to the other end of the line segment. Such cases preclude implementation of protection logic by the local router.

What is needed is a system capable of implementing protection logic on SONET/SDH lines connecting routers to multiplexers that do not transmit protection control bytes on the SONET/SDH line.

SUMMARY OF THE INVENTION

Accordingly, an apparatus, system and method for a communications network is provided that implements protection logic on SONET/SDH lines connecting routers and multiplexers without using multiplexers complying with SONET/SDH specifications. The system and apparatus includes at least one interface circuit that reads frame data received from the communications network and writes frame data to be transmitted over the communications network, the frame data including a plurality of transport overhead fields. The system and apparatus further includes signature logic coupled to the interface circuit, wherein the signature logic determines and writes the signature data into transport overhead fields in an outgoing frame. The system and apparatus also includes reflector logic coupled to the interface circuit, wherein the reflector logic copies signature data from at least one of the received transport overhead fields, the copied data being placed into a transport overhead field in the outgoing frame, the copied data including the received signature data. The identifying signature data includes data identifying the interface as one of an automatic protection switching (APS) working circuit, an APS protect circuit, and a non-APS circuit. Additionally, the interface circuit compares the copied data to earlier received signature data from the communications network to determine whether the copied data matches the earlier received signature data, the determination of a mismatch identifying a route transition requiring an update at least one routing table.

According to another embodiment, the reflected signature data received by an interface is used to determine configuration compatibility between the interface and a second interface, and between the two interfaces and a plurality of tributary interfaces.

An embodiment related to a method for a communications network includes a plurality of interfaces in at least one local router and at least one remote router, wherein the method includes transmitting signature data in a transport overhead field to at least one remote router, the data identifying one of the interfaces in the local routers. The method further includes the step of returning the data to the plurality interfaces, and, in the local router, configuring a communications relationship using the returned signature data. The method also includes using the signature data to determine whether a multiplexer transitioned from reading one of the plurality of interfaces to another of the plurality of interfaces. According to an embodiment of the method, the data is transported via a transport overhead field which is a path level overhead field of a frame, such as a path trace byte. The path level overhead field is received and transmitted by a plurality of intermediate add-drop multiplexers, the plurality of intermediate add-drop multiplexers maintaining the transport overhead field.

According to another embodiment, the method includes comparing the signature data to earlier received signature data from the communications network to determine whether to update at least one routing table and using the data to determine configuration compatibility among a plurality of interface circuits.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
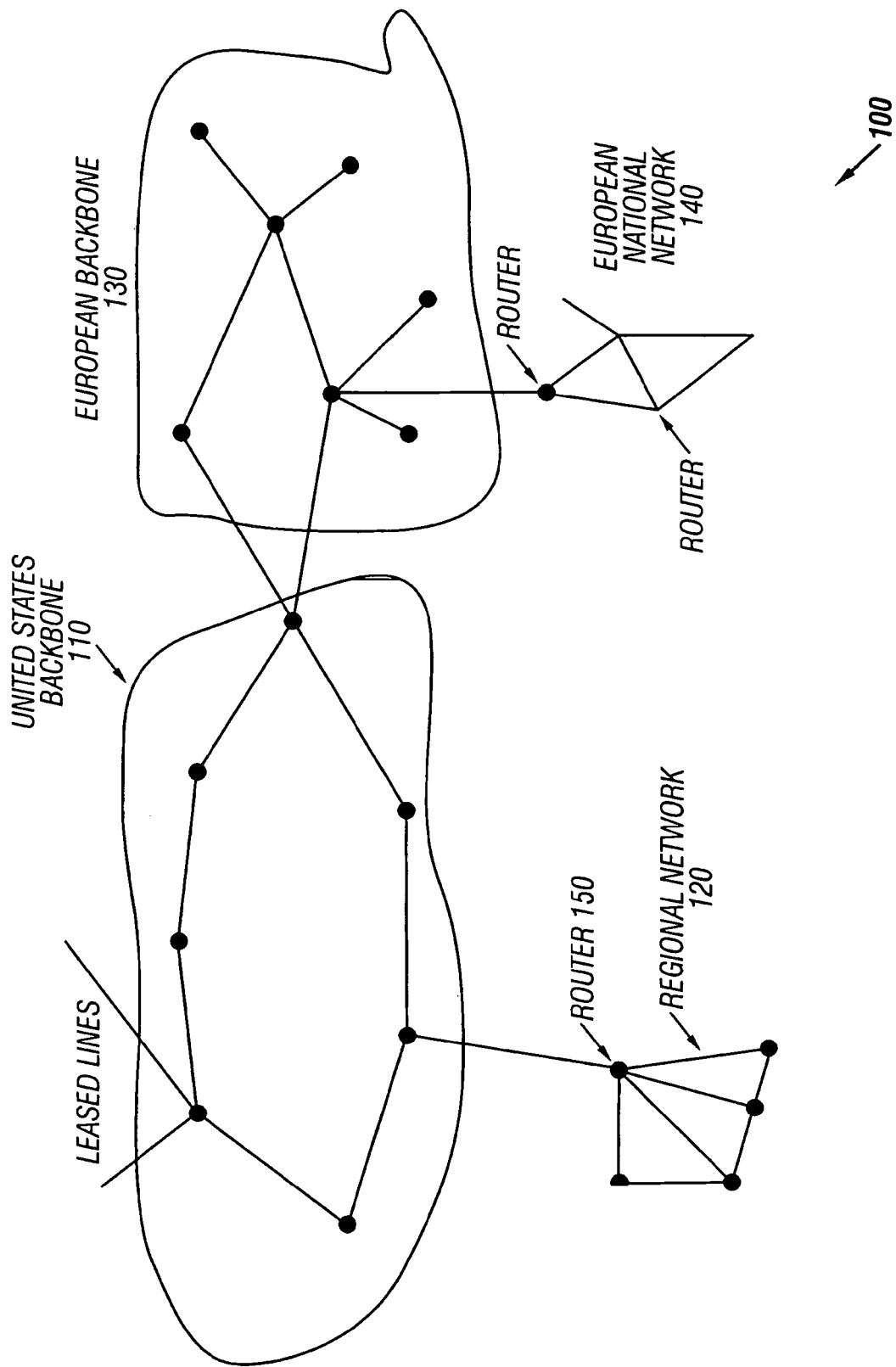
FIG. 1 is a block representation of a communication system including SONET/SDH networks.

Referring to FIG. 1, block representation of a Synchronous Digital Hierarchy (SDH)/Synchronous Optical NETwork (SONET) communication system 100 shows a communications network including fiber optic networks. The network includes a United States backbone network 110 and a European backbone 130 networked together with a regional-level network 120 and a European national-level network 140. Networks 120 and 140 include "Wide Area Networks" (WANs) that also include fiber optic networks. Attached to the regional-level networks 120 could be "Local Area Networks" (LANs). The communication system 100 includes networks following the SONET or the SDH protocols for transmitting data organized into SONET or SDH frames.

Referring to Table 1, a portion of a SONET frame, 9 rows and 270 columns, shows the organization of a SONET OC-3c (concatenated) frame, according to the BellCore STS-3c standard for SONET, which is incorporated herein by reference. The frames are transmitted row by row, from top to bottom, column byte by byte, 8000 frames/sec.

TABLE I

|  |  | ←--------- 9 Bytes ---------→ | ←1B→ | ←------ 270 Bytes ------→ ←------ 260 Bytes ------→ |  |  |  |  |  |  |
|---|---|---|---|---|---|---|---|---|---|---|
| SOH | A1 | A1 | A1 | A2 | A2 | A2 | J0 | Z0 | Z0 | J1 |
|  | B1 |  |  | E1 |  |  | F1 |  |  | B3 |
|  | D1 |  |  | D2 |  |  | D3 |  |  | C2 |
| Point | H1 | H1 | H1 | H2 | H2 | H2 | H3 | H3 | H3 | G1 |
| LOH | B2 | B2 | B2 | K1 |  |  | K2 |  |  | F2 |
|  | D4 |  |  | D5 |  |  | D6 |  |  | H4 |
|  | D7 |  |  | D8 |  |  | D9 |  |  | Z3 |
|  | D10 |  |  | D11 |  |  | D12 |  |  | Z4 |
|  | S1 | Z1 | Z1 | Z2 | Z2 | M1 | E2 |  |  | Z5 |

Synchronous Payload Envelope (SPE)

(9 Bytes X 260 Bytes)

NOTE:
(Section Overhead (SOH) (3 × 9 Bytes), + Pointer (1 × 9 Bytes), + Line Overhead (LOH) (5 × 9 Bytes), + Path Overhead (POH) (9 × 1 Bytes),) = Transport Overhead for OC-3c (STS-3c) Frames. The POH is the 10th Byte in each of the 9 rows (J1, B3, C2, G1, F2, H4, Z3, Z4, Z5).

The OC-3c designation indicates that the carrier is not multiplexed, but carries data from a single source. Thus, the data stream is from a single source at 155.52 Mbps with three OC-1 streams within an OC-3c stream interleaved by column. The interleaving of streams produces a frame 270 columns wide and 9 rows deep. An OC-3c stream produces more actual user data than an OC-3 stream due to the path overhead column being included inside an SPE once instead of three times as is the case for three independent OC-1 streams. Accordingly, as shown in TABLE 1, 260 of the 270 columns within the frame are available for user data in OC-3c as compared to 258 columns available in OC-3. A similar protocol to OC-3c is provided for European systems in ITU G.783. Although the OC-3 standard is presented, one of ordinary skill in the art with the benefit of the disclosure herein appreciates that the embodiments herein described apply to other SONET and SDH standards.

As shown in TABLE 1, the first ten bytes of a SONET OC-3c frame constitute transport overhead, followed by 260 bytes of Synchronous Payload Envelope. The ten bytes of transport overhead include section overhead, line overhead and path overhead bytes. In general, certain bytes of the transport overhead only travel between each section, and are reconfigured at each section boundary. Other transport overhead bytes travel through section boundaries and are reconfigured at line boundaries. For example, an Add-Drop Multiplexer (ADM) receiving a SONET frame will interpret the line overhead bytes. These line overhead bytes will not be sent on through the network. Instead the ADM generates new line overhead bytes for transport through the network. Unlike the line overhead and section overhead bytes, path overhead bytes are received and interpreted at the ends of a path. Accordingly, a frame received by an ADM will neither remove nor reconfigure path overhead bytes.

Figure 2:
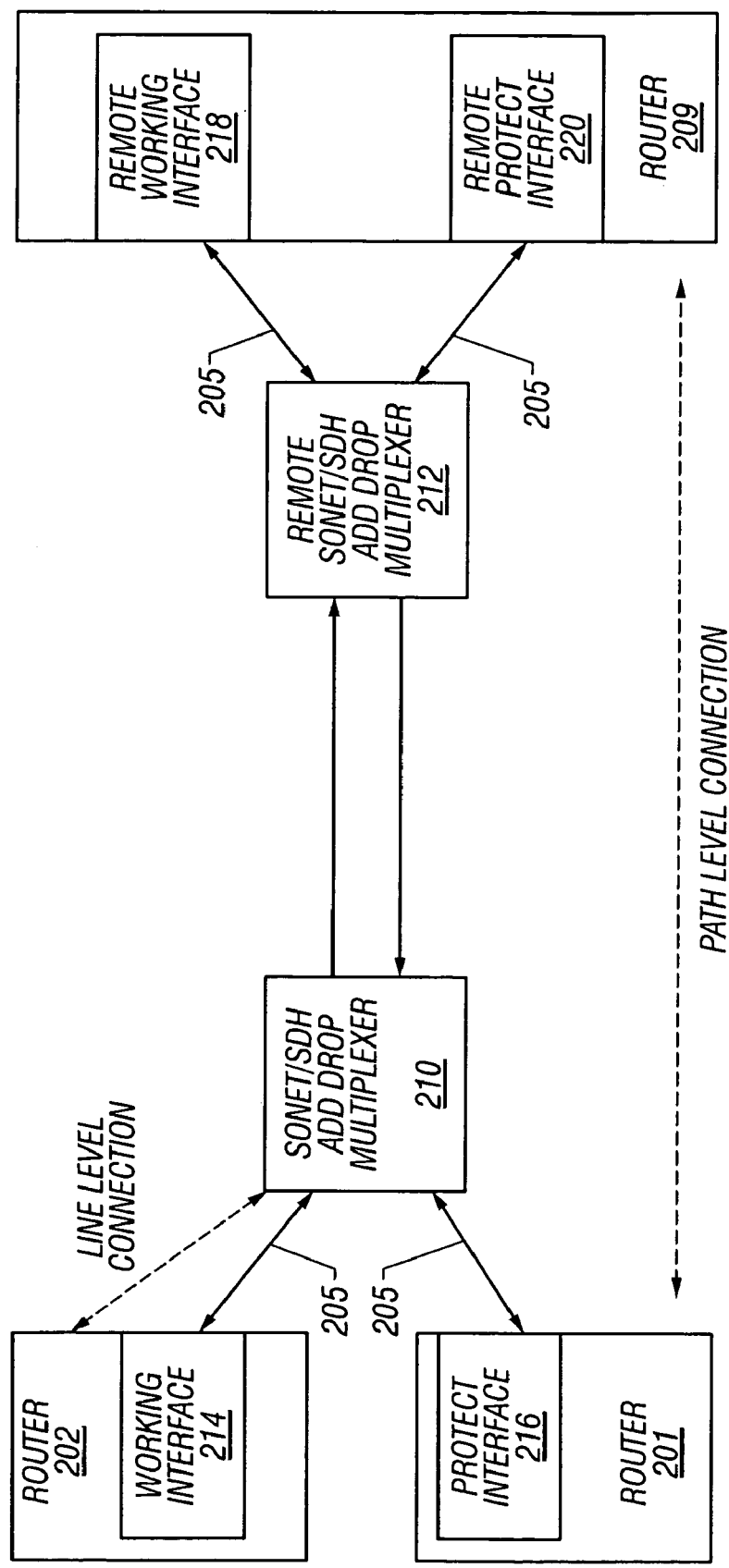
FIG. 2 is a generalized block diagram of a SONET/SDH network implementing a techniques in accordance with embodiments of the present invention.

Referring now to FIG. 2, a SONET/SDH network is shown implementing a 1+1 linear APS system, in each of two locations, one local and one remote. In both locations, the line overhead bytes are received and regenerated anew by the line terminating equipment (LTE) at the ends of SONET/SDH lines. As shown, a first Add-Drop Multiplexer (ADM) 210 is connected via one or more SONET/SDH fiber optic lines to a second ADM 212. Each of ADM 210 and ADM 212 are coupled to at least one router via a SONET/SDH fiber optic line 205. For example, ADM 210 is shown coupled via SONET/SDH fiber optic line 205 to working interface 214 housed in router 202; ADM 210 is also coupled via another fiber optic line 205 to and protect interface 216 housed in router 201. Working interface 214 and protect interface 216 optionally may be housed in the same router. ADM 212 is shown coupled via SONET/SDH fiber optic line 205 to remote working interface 218; ADM 212 is also coupled via another fiber optic line 205 to remote protect interface 220. Both remote working interface 218 and remote protect interface 220 are housed in router 209. Each of the interfaces, 214, 216, 218 and 220 are SONET/SDH path terminating equipment (PTE) interfaces.

Normally, in 1+1 linear APS, ADM 210 bridges all data to be transmitted to the working and protect interface circuits 214 and 216 via the fiber optic lines 205.

In system terminology, the connection between router 202 and ADM 210 is a line level connection. The connection between router 201 and router 209 is a path level connection. The connection between an ADM such as ADM 210 and any other elements in a SONET network consists of one or more line level connections.

A routing protocol running in each router, such as the higher-level routing protocols "Intermediate System to Intermediate System" (IS—IS), or "Border Gateway Protocol" (BGP), based on the Internet Protocol (IP), maintains one or more routing tables. The routing tables associate outgoing interfaces with destination network addresses. Ideally, when a network configuration changes, as it does because of an APS switch, every involved router receives immediate notification of the new configuration.

Referring now to TABLE 1 and FIG. 2 in combination, the "line" overhead bytes for a SONET system include bytes designated "K1" and "K2". These bytes provide a communication channel for carrying information related to Automatic Protection Switching (APS). Byte K2 is also used to carry line layer maintenance signals.

According to the SONET/SDH specifications for a 1+1 linear APS or MSP system, any data transmitted to ADM 210 from ADM 212 is transmitted to working interface 214 housed in router 202 and to the protect interface 216 also housed in router 201. Likewise, ADM 212 transmits data to the remote working interface 218, and to remote protect interface 220, both housed in router 209. A SONET network implementing APS uses bytes K1 and K2 in the line overhead portion of the frame to identify the interface, either working or protect, from which an ADM is currently receiving data. Thus, for example, ADM 210 bridges all transmissions equally to two separate interfaces, working interface 214 and protect interface 216, but "listens" to only one of the two interfaces. The working and protect interfaces 214 and 216 are managed by logic running in the router containing the protect interface, such as router 201, which contains protect interface 216. The APS logic activates for transmitting only the interface currently selected for "listening" by the ADM. The non-selected interface is held in a "Protocol Down" state by the router to prevent transmission of data packets on the circuit. For example, if ADM 210 selects the working interface 214, the APS logic in router 201 commands router 202 to activate the working interface 214. Regardless of whether a protect interface or a working interface is currently selected, the protect interface 216 conducts an ongoing protocol dialog with ADM 210, using SONET bytes K1 and K2 or appropriate SDH bytes in the line overhead.

Normally, a protect interface depends on the APS or MSP protocol transmitted by the ADM to determine whether the ADM is currently selecting the working or protect circuit. Lacking this determination, the APS logic running in the router containing the protect interface is unable to determine whether to activate the working interface or the protect interface.

For example, assume ADM 210 does not transmit APS/MSP protocol. ADM 210 detects errors on the tributary circuits, and selects either the working or protect circuit. ADM 210 thus transmits all data to both working interface 214 in router 202 and protect interface 216 in router 201. However, because ADM 210 does not transmit APS/MSP protocol, the APS logic in router 201 is unable to determine whether it should activate the working interface 214 or the protect interface 216. Therefore, protect interface 216 is unable to respond appropriately to an APS switch in ADM 210. As a result, an APS switch in ADM 210 results in a mismatch between the selection state of the ADM and the selection state of the router interfaces. Further, the currently active interface does not correspond to the circuit currently selected by the ADM. Thus, communication is lost between the currently active interface, either the working interface 214 or the protect interface 216, and the currently active interface connected to ADM 212, either remote working interface 218 or remote protect interface 220.

Systems configured for APS/MSP currently do not provide early notification of an APS switch to the currently selected remote interface. For example, assume ADM 210 is configured to receive APS bytes from protect interface 216. If a break in the fiber optic line between the working interface 214 and ADM 210 occurs, an APS switch will take place within 50 ms., resulting in the activation of the protect interface 216, and the deactivation of the working interface 214. Such an APS switch necessitates a routing reconvergence before data flow is restored.

The BellCore specification GR-253, incorporated herein by reference, requires APS switches to be completed within 50 ms of a failure causing an APS switch. Although an APS switch may be complete within 50 ms, the switch necessitates rewriting of routing tables in all routers affected by the APS switch before data flow is restored. For example, assume the SONET/SDH system shown in FIG. 2 is a network following an Internet Protocol (IP). Should ADM 210, working interface 214 and protect interface 216 require a state transition due to an APS switch, the routing tables must be updated in at least the currently active member of the pair of routers 201 and router 202, and router 209 connected to ADM 212, to enable forwarding of data to the currently active interface attached to ADM 210. In system terminology, the connection between the two directly-communicating routers, the "adjacency" of the routers, must be established before traffic can flow between the two routers.

Prior to the APS switch that causes interface deactivation in working interface 214 and the activation of the protect interface 216, an adjacency exists between working router 214 and the currently active router connected to ADM 212. This adjacency is reflected by adjacency entries in the routing tables of routers 201 and the currently-active router connected to ADM 212. The adjacency must be deleted from the routing table of the current-active router connected to ADM 212 before a new route can be established, leading from that router to the newly-activated protect interface 216. Typically, a route reconvergence can require a lengthy time-out, much longer than the 50 ms APS switching time before communication is reestablished.

The system and method of the present invention solves the problems discussed above in both SONET and SDH systems. The system and method establishes a communication channel between a remote router and the above-described APS logic running in a router containing a protect interface. According to an embodiment of the system and method, a portion of a transmitted frame dedicated to "path" level communication provides a communication channel for carrying information concerning whether a working or protect tributary is currently selected by the ADM. Further, according to an embodiment, all router interfaces write distinctive identifying signature data, the signature data identifying a sending router interface as a working interface, a protect interface or a non-APS interface.

More specifically, referring to FIG. 2, according to an embodiment of the present invention, working interface 214 and protect interface 216 each transmits distinctive identifying signature data in the form of bits in a path overhead byte, as in, for example, a path overhead byte in a SONET OC-3c (concatenated) frame or a similar path overhead byte in an SDH frame. ADM 210 selects one of the circuits 205 as the active circuit, either the circuit connecting ADM 210 to working interface 214, or the circuit connecting ADM 210 to protect interface 216. The signature data is transmitted to ADM 212 and transmitted to both remote working interface 218 and remote protect interface 220. Router 209 determines, from the received bits in the path overhead byte holding the signature data, whether ADM 210 is transmitting data frames from working interface 214 or protect interface 216 to ADM 212. One of skill in the art with the benefit of the information contained herein will appreciate that the disclosed system does not depend on MPS or APS switching information generally transmitted in line overhead bytes in a SONET frame or SDH frame. The time required for a router at one end of a path level connection to detect a transition by an ADM affecting a router at another end of a path level connection is greatly reduced.

More specifically, router 209, using control logic, actively keeps track of which of working interface 214 and protect interface 216 is currently selected by ADM 210. Thus, if working interface 214 fails and an APS switch takes place in ADM 210, the path overhead bytes received by remote router 209 would contain identifying signature bits of protect interface 216. When the value of incoming identifying signature data changes, router 209 recognizes that an APS switch of interfaces has occurred at ADM 210. Then, router 209 notifies the associated routing algorithm in router 209 that the now-defunct adjacency with router 202 should be deleted immediately, without waiting for the normal time-out to expire.

The above method advantageously provides advance notification to remote routers of an APS/MSP switch, thereby decreasing the time required to complete the reconfiguration of routing tables made necessary by the APS/MSP switch. The advance notification occurs independently of whether the remote routers are configured for APS/MSP, or whether the ADMs involved comply with the requirement to communicate with a protect interface using the APS protocol. A remote router uses the incoming values of the identifying signature to actively keep track of which APS interface is currently selected by an ADM. When the value of an incoming identifying signature changes, the remote router recognizes that an APS switch has occurred. If a switch is detected, the remote router will notify the routing algorithm in the remote router that an adjacency with a deselected router should be reconfigured.

According to an embodiment of the present invention, the path overhead portion of every frame received by a remote router includes the identifying signature of the interface that transmitted the frame. In a SONET/SDH system, the information identifying a source interface as a working interface, a protect interface, or a non-APS interface, is optionally located in a path level overhead field. Referring back to Table 1, one such path overhead field is the path trace message, conveyed by the path trace byte J1 byte in a SONET system. Using the J1 byte, a local PTE injects identifying signature data, such as a bit string, into a frame for transmission, wherein the bit string identifies the transmitting router and PTE. One of ordinary skill in the art with the benefit of this disclosure will appreciate that other path overhead fields are capable of carrying the identifying signature and such other fields are within the scope of the present invention.

According to another embodiment, referring to FIG. 2, in a 1:n linear APS system in which data is not bridged to both router 202 and router 201, identifying signature data is copied into the path overhead of every frame transmitted by the remote router. The path overhead is passed through to either working or protect interfaces within the receiving router because path overhead bytes are received and interpreted at the ends of a path according to both SONET and SDH specifications. The remote receiving router detects the signature data injected into the frame and interprets the detected signature data to determine whether the transmitting interface, whether working or protect, has changed since the last detected signature data. The determination provides early notification to the receiving interface of whether an APS switch occurred at another end of the path. One of ordinary skill in the art appreciates that this early notification is appropriate for at least 1+1 linear APS and 1:n linear APS systems.

Using the signature data, a router at one end of a SONET path is able to determine when an APS switch has occurred at another end of the path. Additionally, the reflected signature data enables a router to implement protection logic even if an ADM to which the router is directly connected does not transmit protection control bytes.

Another embodiment of the present invention includes an apparatus for a communications network, such as a SONET or an SDH communication network. The apparatus includes at least one interface circuit, the interface circuit located, for example, in a remote router.

The apparatus further includes signature logic coupled to the interface circuit, wherein the signature logic places identifying signature data into a path overhead field of a frame. The signature data includes information identifying the interface circuit as an APS working interface, an APS protect interface, or a non-APS interface. According to one embodiment, the path overhead field is a path trace byte, which is present in both SONET and SDH systems. In successive frames, the path trace byte transmits the contents of a multi-byte path-trace message. The length of the message is configurable as 64 bytes or 16 bytes. Depending on the configuration, therefore, the entire contents of a path trace message is transmitted every 64 or 16 frames. One of ordinary skill in the art will appreciate that other path level fields in SONET/SDH are capable of transmitting the copied data and are within the scope of the present invention.

Also included in the apparatus is reflector logic coupled to the interface circuit, wherein the reflector logic copies signature data from at least one of the path overhead fields in an incoming frame and writes the signature data into a path overhead field in an outgoing frame. The signature data in the outgoing path overhead field includes information identifying the original sender of the incoming path overhead field. The identifying signature data includes data identifying the originating interface as either an APS working interface, an APS protect interface, or a non-APS interface.

Also included in the apparatus is reflector logic coupled to the interface circuit, wherein the reflector logic copies the signature data from one of the received path overhead fields. The reflector logic may be coupled to the interface circuit, both of which may be located in a remote router.

The copied signature data is placed into a transport overhead field in the outgoing frame. The copied signature data includes the received identifying signature data. The outgoing frame may include either a SONET or SDH frame for transmitting over the communications network. The transport overhead field includes any field capable of being transmitted as a "path" level field. The copied data in the transport overhead field includes information identifying a source interface. For example, the copied data includes data received by the remote router from a local router.

According to this embodiment, the copied identifying signature data is transmitted via path overhead bytes for retransmission to an originating interface. The copied identifying signature data is detected as having been transmitted by a remote interface. Using the copied identifying signature data, the receiving interface determines whether the original transmitting interface matches the identifying signature data of the receiving interface. If the identifying signature data does not match the identifying signature data of the receiving interface, a change is thereby detected, permitting the interface to detect when an APS switch has occurred in a connected multiplexer. The connected multiplexer, therefore, is not required to transmit protection control bytes for the APS switch to be detected by the receiving interface.

According to an embodiment, the apparatus further includes another one or two interface circuits coupled via the communications network to the interface circuit. The one or two interface circuits are capable of receiving the copied signature data. For example, a local router that initially transmitted the data in the path overhead field to the remote router includes an interface circuit capable of receiving the copied data. Likewise, a router with protect interface is also capable of receiving the copied signature data. In systems in which an ADM transmits data to both attached routers, such as in 1+1 linear APS systems, as well as in systems in which an ADM transmits data to just the active router, such as in 1:n linear APS systems, the router holding the active interface attached to such an ADM will receive the reflected data.

The ADM receiving the signature data for transmittal to a local router transmits the data in a path overhead field, thereby maintaining the data in the state in which it was received from the remote router. In one embodiment, the local router holding a protect interface uses the copied data to configure a communications relationship with the local routers, the ADM, and the remote router or routers.

In a system using ADMs that do not comply with the APS protocol requirement to communicate with a protect interface using the APS protocol, the system and method advantageously allows routers to function in a manner similar to that of a system using ADMs with APS or MSP. More specifically, once a router with a protect interface reads the identifying signature data copied into path overhead bytes transmitted by a remote router, the router with the protect interface determines which local interface an ADM is reading. The router holding a protect interface uses control logic to read the identifying signature data and to activate the correct interface.

Figure 3:
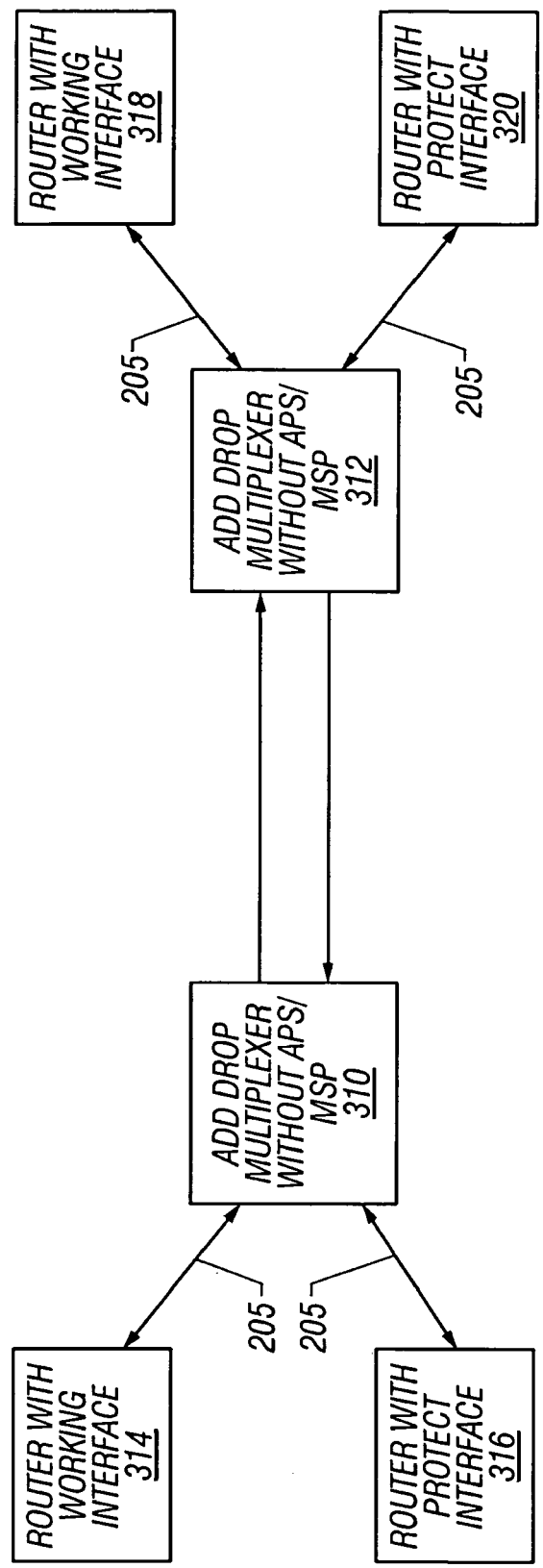
FIG. 3 is a block diagram of a SONET/SDH network without Automatic Protection Switching/Multiplex Section Protection capable of implementing a reflection technique in accordance with an embodiment of the present invention.

As an example, referring to FIG. 3, according to an embodiment of a method of the present invention, remote router 318 reflects an identifying signature in frame path overhead bytes that indicates that the currently selected remote interface, either the working interface of router 318 or the protect interface of router 320 received data from router 314. The path overhead bytes are received by both the working interface of router 314 and the protect interface of router 316. Using control logic, router 316 reads the identifying signature data copied into path overhead bytes transmitted by a remote router 318 or router 320. Next, using control logic, router 316 determines that the working interface in router 314 is the interface that ADM 310 is reading and activates the working interface of router 314.

Another embodiment of the present invention concerns the signaling link between a working and a protect interface. As discussed above, in either an APS or an MSP system, the protect interface and the ADM negotiate, using the APS protocol, whether the ADM should listen to the working or protect interface. The protect interface activates either the working or protect interface. The signaling link between the working and protect interfaces provides the communication path whereby the protect interface controls whether the working interface is or is not activated. The proper functioning of APS/MSP systems therefore depends on continuous communication between the working and protect interfaces, using a communication link independent of the protected circuits.

In general, when the communication link between the working and protect routers fails, the working interface is activated and the protect interface is deactivated. In situations in which the communication link fails during a period in which the protect interface is active, the failure of the communication link therefore causes an APS switch to occur, and the protect interface requests, via the APS protocol, that the ADM select the working interface. If, at this time, the working interface, or the circuit connecting the working interface with the ADM, is a failed condition, then connectivity to remote routers is lost. Meanwhile, the protect interface, which did not fail and, therefore, could take over communications, disables itself.

A further problem concerning the signaling link between a protect interface and a working interface occurs when the failure that caused lost communications is in the signaling link itself. In some cases, both the protect and the working interface may send data to ADM simultaneously, causing service disruptions.

According to an embodiment of the present invention, a signaling link failure does not default to a working interface. Instead, upon a signaling link failure, both a working interface router and a protect interface router keep the same communication configuration. More specifically, both working and protect interfaces use the identifying signature data reflected from a remote router interface to determine which interface is currently being read by an ADM. Thus, each interface activates or deactivates its own link to the ADM as needed.

Figure 4:
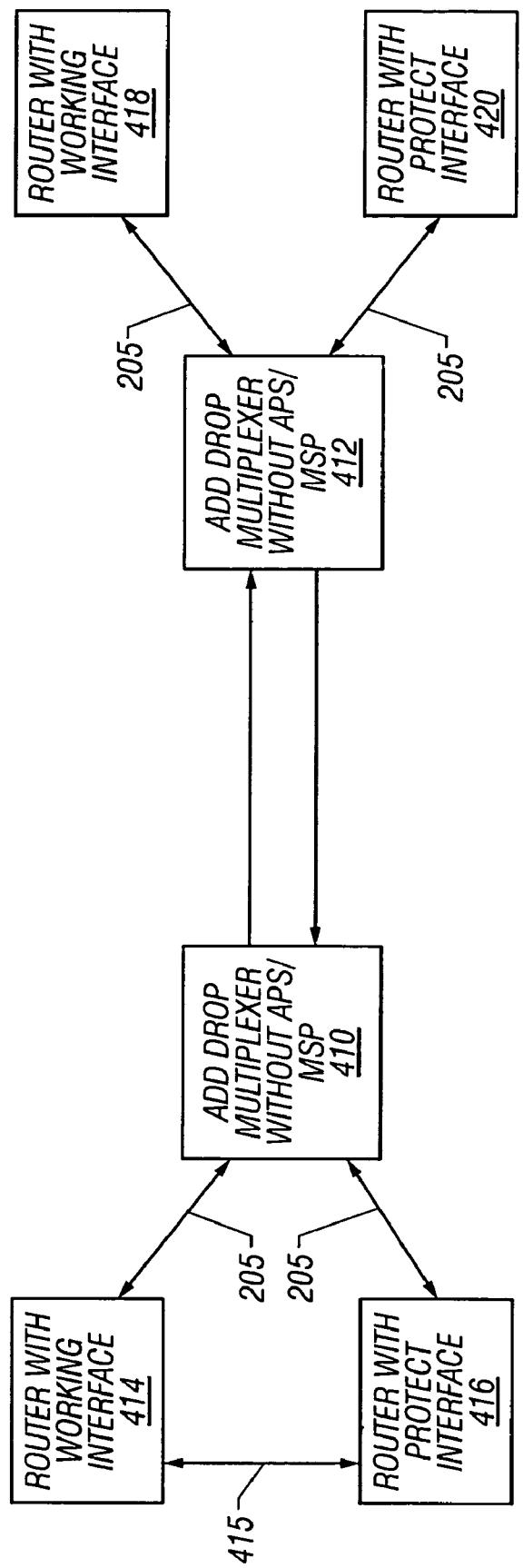
FIG. 4 is a block diagram of a SONET/SDH network demonstrating the use of a reflection technique during signaling link failures between a working interface in a router and a protect interface in a router in accordance with an embodiment of the present invention.

More specifically, referring to FIG. 4, if a signaling link failure occurs between the working interface of router 414 and the protect interface of router 416, then router 416 uses the reflected information transmitted in the path overhead to determine the selection state of the ADM, and activate or deactivate its own link accordingly. In one embodiment, both router 418 and router 420 receive the identifying signature data in the path overhead, and both copy the signature data back in the outgoing path overhead for transmittal to router 414 and router 416. By reading the copied signature data, both router 414 and router 416 determine the selection state of ADM 410. If ADM 410 is currently selecting the link to the working interface of router 414, router 414 activates its link to the ADM and the protect interface of router 416 deactivates its link to the ADM. Conversely, if ADM 410 currently selects the link to the protect interface in router 416, then the working interface in router 414 deactivates its link to the ADM and the protect interface in router 416 activates its link to the ADM. In another embodiment, router 416 uses a reflected path trace as well as any information received via the link between the protect interface in router 416 and the working interface in router 414 to automatically confirm or supply the configuration data for the ADM. According to this embodiment, interfaces are capable of verifying that a local interface is compatible with the remote router configuration requirements.

OTHER EMBODIMENTS

Although particular embodiments of the present invention have been shown and described, it will be apparent to those skilled in the art that changes and modifications may be made without departing from this invention in its broader aspects and, therefore, the appended claims are to encompass within their scope all such changes and modifications as fall within the true spirit and scope of the invention. For example, one of skill in the art appreciates that the disclosed embodiments apply to Packet over SONET (POS) and other similar interfaces, but are not limited to POS interfaces. For example, the embodiments relating to a system and method for supporting ADMs that do not use switching protocols apply to POS type interfaces as well as Asynchronous Transfer Mode (ATM) type interfaces. For purposes of identifying the broader aspects of the appended claims, word "a" is generally intended to mean "one or more."

What is claimed is:

1. An apparatus for a communications network, the apparatus comprising:
   at least one interface circuit that reads frame data received from the communications network and writes frame data to be transmitted over the communications network, the frame data including a plurality of transport overhead fields; and
   signature logic coupled to the at least one interface circuit, wherein
      the signature logic identifies signature data and writes the signature data into at least one of a plurality of transport overhead fields in an outgoing frame, and
      the signature data identifies a type of the at least one interface circuit.

2. The apparatus of claim 1 further comprising:
   reflector logic coupled to the at least one interface circuit, wherein the reflector logic copies data from at least one of the received transport overhead fields, the copied data being placed into a transport overhead field in the outgoing frame, the copied data including the received signature data.

3. The apparatus of claim 1 wherein the type of the at least one interface circuit is one of a multiplex section protection (MSP) working circuit, a MSP protect circuit, and a non-MSP circuit.

4. The apparatus of claim 1 wherein the identifying signature data includes data identifying the interface as one of an automatic protection switching (APS) working circuit, an APS protect circuit, and a non-APS circuit.

5. The apparatus of claim 2 wherein the at least one interface circuit compares the copied data to earlier received frame data from the communications network to determine whether the copied data matches signature data identified in the earlier received frame data, the determination of a mismatch identifying a transition by a multiplexer.

6. The apparatus of claim 5 wherein the transition is between a first one of a plurality of routers at a remote location and a second one of said routers.

7. The apparatus of claim 5 wherein the transition is one of an APS switch and an MSP switch.

8. The apparatus of claim 2 wherein the at least one interface circuit compares the copied data to later received frame data from the communications network to determine whether to update at least one routing table.

9. The apparatus of claim 2 further comprising:
   another plurality of interface circuits disposed in at least one router, the router coupled via the communications network to the at least one interface circuit wherein the router reads the copied data including the signature data identifying one of the another plurality of interface circuits as an active interface, and wherein the router uses the copied data to configure a communications relationship.

10. The apparatus of claim 9 wherein the at least one of the another plurality of interface circuits is associated with a protect interface, the protect interface being an active interface when transmission of data is disrupted to a working interface among the another plurality of interface circuits.

11. The apparatus of claim 9 wherein the at least one of the another plurality of interface circuits includes a protect interface router and a working interface, the protect interface functioning as a backup interface, the working interface functioning as a primary interface, wherein at least one router housing the protect interface and the working interface uses the copied data to determine configuration compatibility between the protect interface and the working interface and to determine configuration compatibility among a plurality of tributary interfaces.

12. The apparatus of claim 9 wherein the router uses the copied data to determine configuration compatibility among the another plurality of interface circuits and the at least one interface circuit.

13. An apparatus for a communications network, the apparatus comprising:
at least one interface circuit that reads frame data received from the communications network and writes frame data to be transmitted over the communications network, the frame data including a plurality of transport overhead fields; and
signature logic coupled to the at least one interface circuit, wherein
the signature logic identifies signature data and writes the signature data into at least one of a plurality of transport overhead fields in an outgoing frame, and
the transport overhead field is a path level overhead field.

14. The apparatus of claim 13 wherein the path level overhead field is a byte of a multi-byte path trace message conveyed by a path trace byte.

15. The apparatus of claim 14 wherein the path trace byte is represented by a Synchronous Optical NETwork (SONET) path trace byte of a SONET OC-3c frame, according to a STS-3c standard for SONET, the path trace byte being designated by J1.

16. The apparatus of claim 1 wherein the communications network includes a plurality of add-drop multiplexers, the plurality of add-drop multiplexers receiving and transmitting the copied data in one of a plurality of transport overhead fields while maintaining the copied data.

17. An apparatus for a communications network, the apparatus comprising:
at least one interface circuit that reads frame data received from the communications network and writes frame data to be transmitted over the communications network, the frame data including a plurality of transport overhead fields; and
signature logic coupled to the at least one interface circuit, wherein
the signature logic identifies signature data and writes the signature data into at least one of a plurality of transport overhead fields in an outgoing frame, and
the communications network is a fiber optic network.

18. An apparatus for a communications network, the apparatus comprising:
at least one interface circuit that reads frame data received from the communications network and writes frame data to be transmitted over the communications network, the frame data including a plurality of transport overhead fields; and
signature logic coupled to the at least one interface circuit, wherein
the signature logic identifies signature data and writes the signature data into at least one of a plurality of transport overhead fields in an outgoing frame, and
the communications network is one of a Synchronous Digital Hierarchy (SDH) and a Synchronous Optical NETwork (SONET).

19. An apparatus for a communications network, the apparatus comprising:
at least one interface circuit that reads frame data received from the communications network and writes frame data to be transmitted over the communications network, the frame data including a plurality of transport overhead fields; and
signature logic coupled to the at least one interface circuit, wherein
the signature logic identifies signature data and writes the signature data into at least one of a plurality of transport overhead fields in an outgoing frame,
the signature logic is a program product, and
the program product comprises signal bearing media comprising instructions for implementing:
means for identifying the signature data, and
means for writing the signature data into at least one of the plurality of transport overhead fields in an outgoing frame.

20. The apparatus of claim 19 wherein the signal bearing media further comprises recordable media.

21. The apparatus of claim 19 wherein the signal bearing media further comprises transmission media.

22. The apparatus of claim 2 wherein the reflector logic is a program product and wherein the program product comprises signal bearing media comprising instructions for implementing:
means for copying data from received transport overhead fields, and
means for placing the copied data into a transport overhead field in an outgoing frame.

23. The apparatus of claim 22 wherein the signal bearing media further comprises recordable media.

24. The apparatus of claim 22 wherein the signal bearing media further comprises transmission media.

25. A method for a communications network including at least one local router and at least one remote router, the method comprising:
transmitting data in a transport overhead field to at least one remote router, the data identifying an active interface in the local router;
receiving the data at the local router reflected from the remote router; and
configuring a communications relationship using the data.

26. The method of claim 25 further comprising:
avoiding alteration of the data by one or more add-drop multiplexers.

27. The method of claim 25 further comprising:
in the remote router, using the data to determine which among a plurality of local interface circuits is the active interface in the local router.

28. The method of claim 25 further comprising:
in the remote router, using the data to determine whether there has been a transition among a plurality of local interface circuits, the transition changing the identity of the active interface in the local router.

29. The method of claim 25 wherein the transport overhead field is a path level overhead field of a frame, the path level overhead field being received and transmitted by a plurality of intermediate add-drop multiplexers, the plurality of intermediate add-drop multiplexers maintaining the transport overhead field.

30. The method of claim 29 wherein the path level overhead field is a byte of a multi-byte path trace message conveyed by a path trace byte.

31. The method of claim 30 wherein the path trace byte is represented by a Synchronous Optical NETwork (SONET) path trace byte of a SONET OC-3c frame, according to a STS-3c standard for SONET, the path trace byte being designated by J1.

32. The method of claim 25 further comprising:
comparing the data to later received frame data from the communications network to determine whether to update at least one routing table.

33. The method of claim 25 further comprising:
using the data to determine configuration compatibility among a plurality of interface circuits.

34. The method of claim 25 wherein the communications network is a fiber optic network.

35. The method of claim 25 wherein the communications network is one of a Synchronous Digital Hierarchy (SDH) and a Synchronous Optical NETwork (SONET).

36. A system for a communications network, the system comprising:
means for transmitting data in a transport overhead field to at least one remote router, the data identifying an active interface in the local router;
means for receiving the data at the local router reflected from the remote router; and
means for configuring a communications relationship using the data.

37. The system of claim 36 further comprising:
means for avoiding alteration of the data by one or more add-drop multiplexers.

38. The system of claim 36 further comprising:
means, in the remote router, for using the data to determine which, among a plurality of local interfaces, is an active interface.

39. The system of claim 36 further comprising:
means for comparing the data to earlier received data from the communications network to determine whether to update at least one routing table.

40. The system of claim 36, wherein the system is a program product and wherein the program product further comprises:
signal bearing media comprising instructions for implementing:
the means for transmitting data in the transport overhead field to the at least one remote router, the data identifying the active interface in the local router,
the means for receiving the data at the local router reflected from the remote router, and
the means for configuring the communications relationship using the data.

41. The system of claim 40, wherein the signal bearing media further comprises recordable media.

42. The system of claim 40, wherein the signal bearing media further comprises transmission media.

* * * * *